United States Patent [19]

Brennen et al.

[11] Patent Number: 4,599,553
[45] Date of Patent: Jul. 8, 1986

[54] MALFUNCTION DETECTOR FOR STATIC VAR CONTROLLERS

[75] Inventors: Michael B. Brennen, Pittsburgh; Miklos Sarkozi, Murrysville, both of Pa.

[73] Assignee: Westinghouse Electric Corp., Pittsburgh, Pa.

[21] Appl. No.: 707,000

[22] Filed: Feb. 28, 1985

[51] Int. Cl.[4] ................................................. G05F 1/70
[52] U.S. Cl. ..................................... 323/205; 323/208; 340/657
[58] Field of Search ............................... 323/205–211; 340/657, 660–664

[56] References Cited

U.S. PATENT DOCUMENTS

| | | | |
|---|---|---|---|
| 4,007,401 | 2/1977 | Kimmel et al. | 340/664 X |
| 4,172,234 | 10/1979 | Gyugyi et al. | 323/210 |
| 4,241,336 | 12/1980 | Schonken | 340/661 X |
| 4,437,052 | 3/1984 | Gyugyi et al. | 323/210 |
| 4,464,696 | 8/1984 | Masui et al. | 323/210 X |

Primary Examiner—Peter S. Wong
Attorney, Agent, or Firm—M. J. Moran

[57] ABSTRACT

A static VAR generator for providing reactive compensation incorporating a malfunction detector. The static VAR generator comprises a reactance which is linearly responsive to a first linearized control signal and produces an output signal proportional to the reactive compensation which provides a feedback signal. A director control uses the feedback signal and an adjustable reference signal to provide the first linearized control signal based on the difference between the reference and feedback signals. A tracker controller provides a second linearized control signal based on the reference and feedback signals. The second control signal is compensated by an equalizer that determines the difference between the first and second control signals. The compensation counters the difference between the first and second control signals caused by the offset and component tolerances in the two controllers and makes the second control signal substantially equal to and track the first control signal. A first comparator conpares the compensated second control signal with the first control signal. Whenever these two control signals are not substantially equal, a fault has occurred in one of the two controllers. A second comparator compares the first control signal with the output signal. Whenever these two signals are not substantially equal, a fault has occurred in the generator.

In an alternate embodiment an additional tracker control, comparators and default decoder provide a 2 out of 3 polling system for indicating when one of the three controllers is malfunctioning.

7 Claims, 4 Drawing Figures

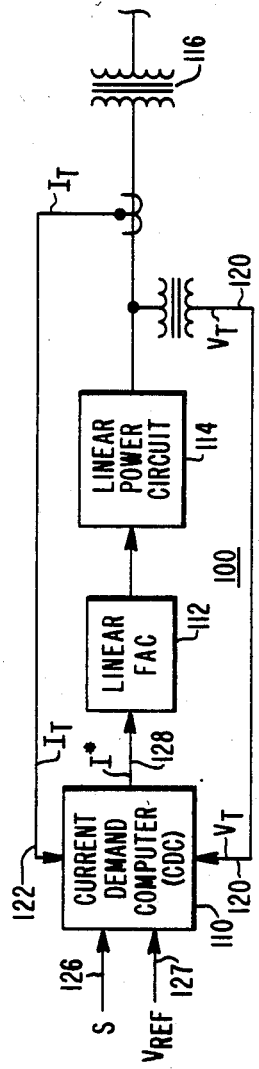
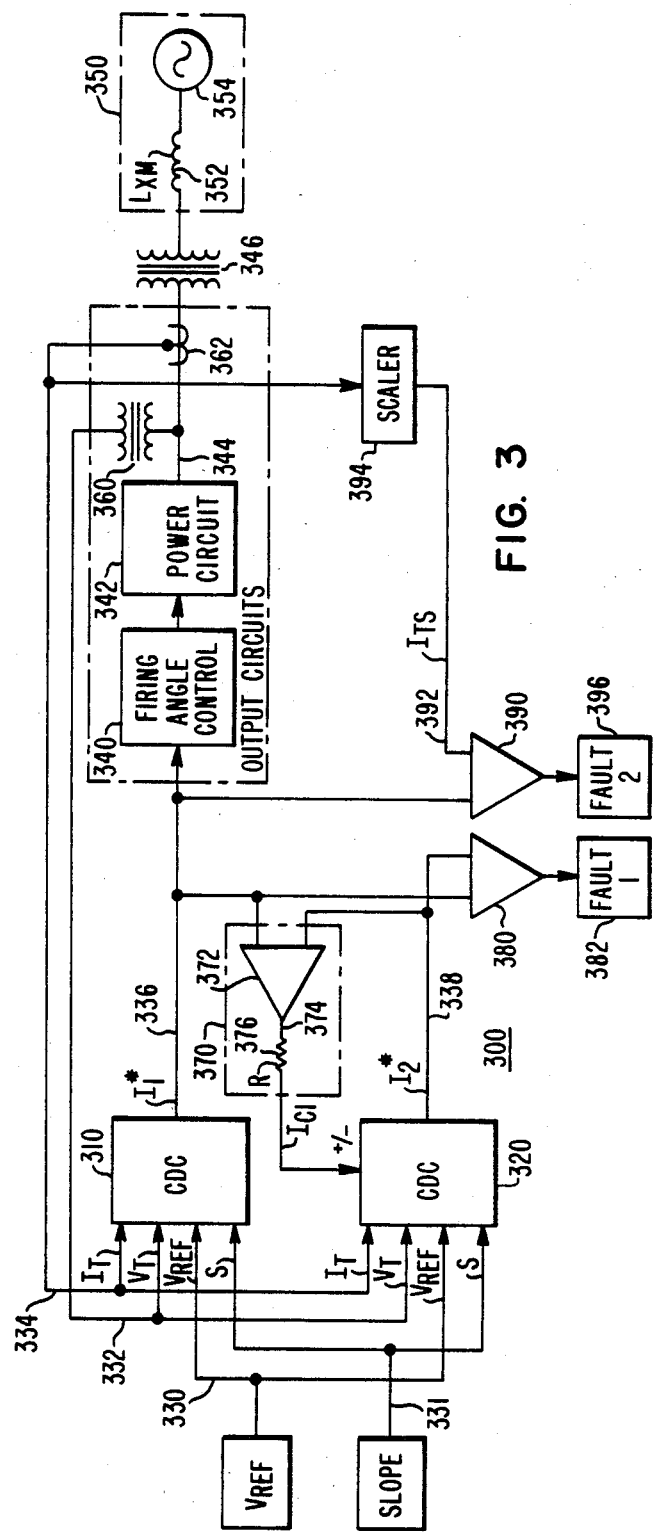
FIG. 2
PRIOR ART
FIG. 3

MALFUNCTION DETECTOR FOR STATIC VAR CONTROLLERS

BACKGROUND OF THE INVENTION

1. Field of the Invention

The present invention is related to static VAR generators that are used to provide reactive compensation to AC electrical networks and especially static VAR generators employing malfunction detectors.

2. Background

Static VAR generators (SVG's) having capacities of several hundred megavolt-amperes are used by electric utilities to preserve the stability of electric power transmission lines. Assurance is needed that the controllers of the static VAR generators are available for system use. Most controllers for SVG's utilize a feedback signal proportional to the output current, output voltage, or both in a closed loop control configuration. By comparing the difference between the feedback signal and a reference signal, representing voltage or power, the output of the SVG is made to track the reference signal. The controllers also incorporate integral control techniques so that over time any error between the output signals and the reference signals tend to be reduced to zero. The output from the integral controllers which represents the amount of error present is sent to the firing angle controllers which determine the firing or gating of the thyristor switches used in the SVG. Control over the output is accomplished by advancing or retarding the firing angle depending on the magnitude and direction of error in the output signal. An example of such a SVG utilizing these control techniques can be found in U.S. Pat. No. 4,172,234 entitled "Static VAR Generator Compensating Control Circuit and Method for Using Same" issued Oct. 23, 1979 to Gyugyi et al.

SVG's connected to the power transmission line provide voltage support or regulation during disturbances by regulating the line voltage with a closed loop control. A typical control implementation contains an adjustable voltage reference, $V_{REF}$, compared against the transmission line voltage, $V_T$, measured at the output terminals of the SVG. The resulting voltage error signal is then used to vary the reactive output of the SVG in a closed loop manner. Another feature generally required in a SVG based AC voltage regulator is voltage regulation according to a V-I (voltage-current) curve. The slope of this V-I curve has a dual purpose. First, it provides an inherent tendency to share the output power between voltage regulators operated in parallel; and second it simultaneously extends the linear control range of compensation while permitting larger system voltage variations.

One method to achieve this V-I slope control is by using a proportional controller where the closed loop gain and the resulting slope is known explicit mathematical function of the open loop gain of the regulator shown in Equation 1.

$$G_{CL} = \frac{G_{OL}(s)}{1 + G_{OL}(s)} \quad \text{Equation (1)}$$

where $G_{CL}$ and $G_{OL}$ indicate closed and open loop gain values, respectively. The required slope setting can thus be achieved by adjusting the open loop gain of the regulator in the electronic control circuit. The open loop gain of the SVG-based voltage regulator also depends on a complex and generally unknown variable—the transmission line impedance, $L_{XM}$, seen at the output terminals of the SVG. Because of this open loop variation in impedance, the required accuracy for the slope setting of the V-I curve cannot be reliably insured. However, an accurate V-I slope setting control scheme that is inherently immune from the open loop control gain variations can be constructed. In this scheme, the voltage reference $V_{REF}$ is continuously offset by varying the amount that is linearly proportional to the average value of the SVG output current $I_T$ as measured at the output terminals of the SVG. A slope controller having as inputs a reference slope setting S and the SVG output current $I_T$ produces a voltage signal SI that is compared to the reference signal $V_{REF}$ generating a voltage error signal, $V^*$. With appropriate scaling, the error signal $V^*$ can exactly represent the required regulation slope of the SVG. $V^*$ is used as an internal reference for the controller of an SVG-based voltage regulator, the controller having a practically infinite steady-state gain implemented by 3 mode control (proportional-integral-derivative control). The main feature of the controller is that it operates without theoretical steady-state error ($V^* \rightarrow 0$) and can therefore regulate the output terminal voltage $V_T$ exactly as called for by the input signal $V^*$ that already incorporates the required slope. The integrated error voltage output of the controller is fed to the output section of the SVG controller a firing angle converter and a firing angle control (FAC) that operate the power thyristor circuit of the SVG. The control system is illustrated in FIG. 1. Using the 3 mode control, it is possible to directly parallel SVG's at the same or nearby transmission line terminals.

With an operating SVG it is extremely difficult to determine if the SVG is operating properly due to the effect of the unknown varying impedance of the electrical network. When observing the control action, the answer to the question is the system acting in response to a disturbance in the system or to a malfunction in the control system is not always readily determined. For an individual SVG comparing the control signal input of the FAC to the output can be used to detect a problem in the output section of the SVG. However this comparison does not determine if the control signal input to the FAC is correct in response to the reference signal and the feedback signal that represents the output of the SVG. Thus it would be advantageous if a means could be provided to determine if there is a malfunction and which section—the control section or output section—of the SVG is malfunctioning. Paralleling of SVG controls will not provide accurate malfunction detection. Due to component tolerances, the outputs of paralleled SVG controls having the same reference signal tend to diverge. Because of this divergence a fault indication based on an inequality between the outputs of the paralleled SVG's is not a reliable malfunction detection scheme.

It is an object of this invention to provide a malfunction detector that can distinguish between a malfunction to either the control section or output section of an SVG.

SUMMARY OF THE INVENTION

In general the invention relates to a static VAR generator for providing reactive compensation to an electrical system incorporating a malfunction detector. The operating circuit for the SVG can be thought of as two interrelated sections—the control section for providing a linearized current control signal, the output section for using this linearized control signal to produce reactive compensation for the electrical network. The control section comprises a primary current demand computer (CDC) that in general includes an error generator, slope control and an integrating amplifier. The output section is a linearized output circuit including a firing angle controller, thyristor gating and power circuits and thyristor switched reactive components such as and/or capacitors. A transducer monitors the controlled variable, typically the output signal of the SVG and produces a feedback signal. The primary CDC utilizes the feedback signal as well as a reference signal generated by an adjustable reference signal source for producing a first linearized control signal in response to the difference between the reference signal and the feedback signal. The linearized control signal also incorporates the desired V-I slope characteristic.

The malfunction detector comprises a tracker CDC, two comparators and an equalizer circuit. The tracker CDC, substantially identical to the primary CDC, provides a second linearized control signal in response to the reference signal and the feedback signal. The second linearized control signal is compensated by the equalizer circuit by an amount that counters the effect produced in the second linearized control signal by the offset and component tolerances of both the primary CDC and the tracker CDC; thereby, making the second linearized control signal equal to and track the first linearized control signal. The first comparator compares the compensated second linearized control signal with the first linearized control signal. A first fault output is produced whenever these two linearized control signals are not substantially equal to one another. This output indicates a fault has occurred in one of the two CDC's. The second comparator compares the first linearized control signal with an appropriately scaled version of the actual output of the output section. A second fault output is provided whenever these two signals are not substantially equal to one another indicating that a fault has occurred in the output section.

In an alternate embodiment a second tracker CDC substantially identical to the primary CDC provides a third linearized control signal. A second equalizer circuit provides compensation to this third linearized control signal to counter the effect produced by the offset and component tolerances of both the primary CDC the second tracker CDC. A third comparator is provided for comparing the compensated third linearized control signal with the first linearized control signal. This comparator has an output whenever these two control signals are not substantially equal to one another. A fourth comparator for comparing the compensated second and third linearized control signals is also provided, this comparator having an output whenever the two compared control signals are not substantially equal to one another. A fault indicator for indicating when one of the three control units is in a fault condition is also provided. The outputs of first, third and fourth comparators serve as inputs to the fault indicator which are decoded to determine which one of the three control units is in a fault condition.

With both embodiments, the equalizer comprises a difference amplifier having a first input connected to the first linearized control signal and a second input connected to the linearized control signal of its respective tracker CDC and has an output proportional to the difference between these two control signals. A summing resistor connected in series between the output of the difference amplifier and the respective tracker control is used to determine the amount of compensation provided to the tracker control. Because the equalizer is used to compensate for offsets and component tolerances in the tracker controls, the amount of compensation provided would be equivalent to a variation in the nominal values of the components of approximately one percent.

BRIEF DESCRIPTION OF THE DRAWINGS

For a better understanding of the invention, reference may be made to the embodiments exemplary of the invention shown in the accompanying drawings wherein:

FIG. 2 is a simplified representation of the diagram shown in FIG. 1;

FIG. 3 is a simplified schematic diagram embodying the present invention; and

DETAILED DESCRIPTION

In a general closed loop voltage control circuit, a controlled parameter is compared with a reference value in a control error generator to produce an error voltage. A control error processor converts the error voltage into a form required by an actuator that in turn produces a variable amount of control force. The actuator modifies the controlled parameter of the system until an equilibrium is established between the reference value and the controlled parameter. A closed loop control will tolerate varying amounts of gain non-linearities, time delays and transport lags, all common in thyristor controlled power circuits. The control signals along the control loop may or may not have linear relationships among themselves. As long as well known gain and phase conditions such as a gain of less than one and a phase shift of 180° are enforced, such closed loop control systems remain stable and the regulation is automatically maintained.

Figure 1:
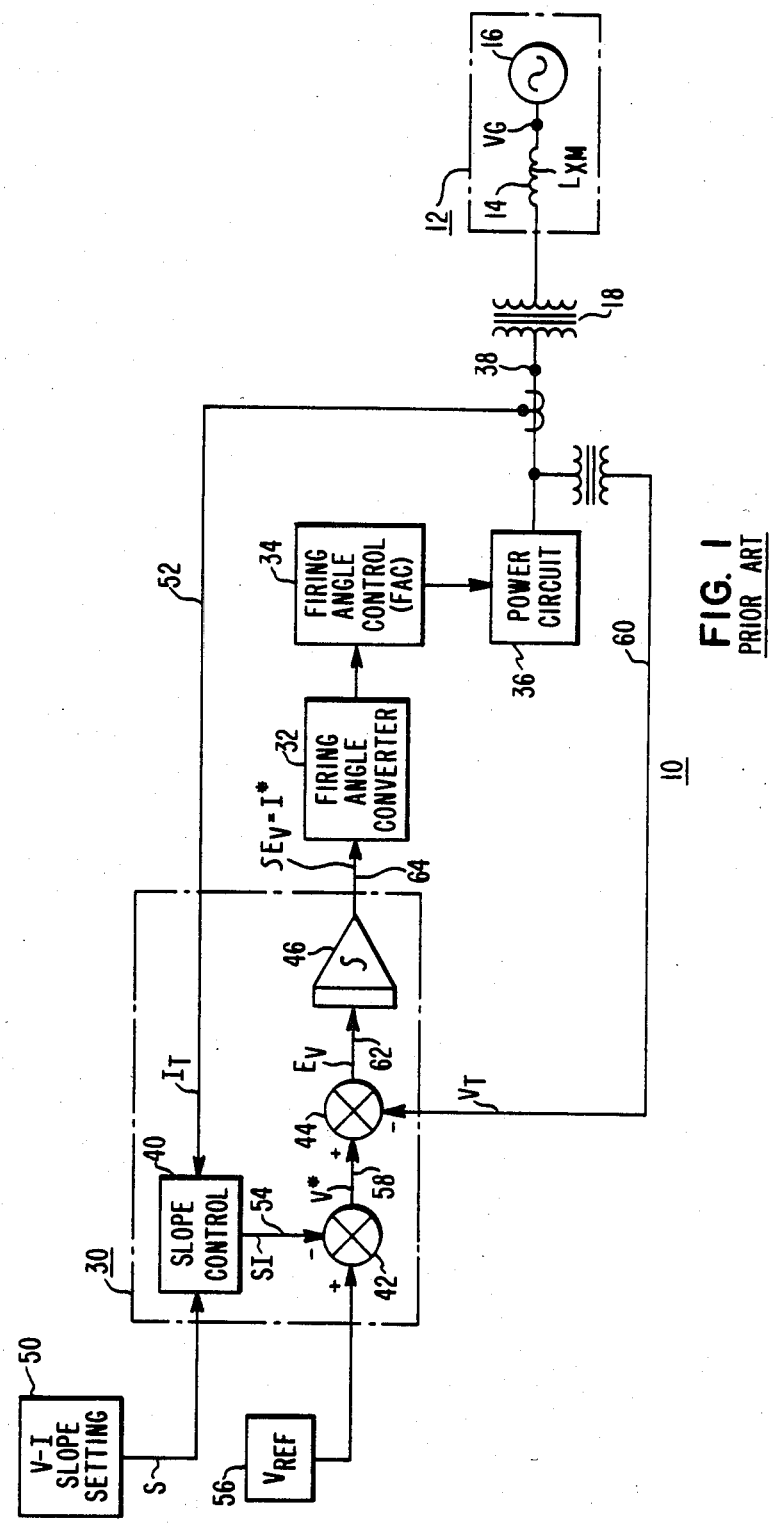
FIG. 1 is a closed loop diagram for an SVC of the prior art.

A simplified equivalent of a closed loop voltage control circuit for a SVG of the prior art is illustrated in FIG. 1 where the SVG 10 is interconnected with the transmission line system 12 via a transformer 18. The transmission line system 12 is represented by the inductor 14 having an unknown and variable transmission line impedance $L_{XM}$ and the voltage generator 16 having a voltage $V_G$. The major blocks of the SVG 10 consist of the control error detector 30, the voltage to firing angle converter 32, the SVG gate firing angle control (FAC) 34 and the SVG power circuit 36 connected at the output terminal 38 to the transformer 18. The control error detector 30 comprises a slope control 40, two error generators 42 and 44 and a 3 mode proportional-integral-derivative (PID) controller 46. The inputs 50 and 52 to the slope control 40 are the desired V-I slope setting S, and the output terminal current $I_T$ of the SVG controller, respectively. At the first error generator 42 the reference voltage signal $V_{REF}$ is continuously offset by the voltage output 54 of the slope control 40. The output 54 of the slope control 40, also designated as SI, is linearly proportional to the average value of the SVG output current $I_T$. The output 58 of error generator 42 is the offset voltage reference V* that is proportional to both the slope setting S and the SVG output current $I_T$. With appropriate scaling the offset voltage reference V* can exactly represent the required regulation for the SVG. V* is then compared at the second error generator 44 with the SVG output terminal voltage $V_T$ that is input 60 to error generator 44. The output 62 of the error generator 44 represents the error voltage $E_V$ that serves as the input to the PID controller 46. The output 64 of the PID controller 46 represents the integrated error voltage $\int E_V$. At a constant $V_{REF}$ setting, the integrated error voltage $\int E_V$ changes with variations of transmission line parameters $V_G$ and $L_{XM}$. It also varies according to a non-linear relationship between the thyristor firing phase angle $\alpha$ and the resulting first harmonic or fundamental current in the inductor 14 and the SVG power circuit 36. This relationship is expressed in equation 2 below:

$$I_T(\alpha) = \frac{V}{\omega L} \frac{2}{\pi} \left( \frac{\pi}{2} - \alpha - \frac{1}{2} \sin 2\alpha \right) \qquad \text{Equation (2)}$$

where $I_T(\alpha)$ is the fundamental current value as a function of the phase angle $\alpha$. Equation 2 is implemented in the firing angle converter circuit 32 that in essence linearizes the output 64 of the integral controller. The output current $I_T$ is related to integrated error voltage $\int E_V$ as set forth in Equations 3-5.

$I_T = K \int E_V$ where K is a gain constant    Equation (3)

$\int E_V = I^*$    Equation (4)

$I_T = KI^*$    Equation (5)

The linear relationship between the output current $I_T$ and the control signal I* that is the linearized output from the PID controller 46 can be seen in Equation 5 and is valid irrespective of any transmission line variations, or voltage reference and V-I slope settings. Because of the overall closed loop control action of the SVG, the error generators, slope controller, PID controller and firing angle converter can be thought of as a current demand computer (CDC) providing a linearized control signal (I*) even though the open loop gain of the SVG varies in a random manner.

As a result of linearization, the control loop can be redrawn as shown in FIG. 2. There the SVG 100 consists of the current demand computer 110, a linear firing angle control (FAC) 112, and a linear power circuit 114 interconnected to the transmission line (not shown) via a transformer 116. Inputs 120, 122, 124 and 126 to the current demand computer 110 are the output voltage $V_T$, the output current signal $I_T$ the reference voltage $V_{REF}$, and the slope reference S, respectively. The linearized output 128 of the CDC 110 is the linearized current control signal I* that is then provided as an input to the linearized circuits of the firing angle control 112 and the power circuit 114. At this point, the output current $I_T$ is in a linear relationship with the current control signal I*.

A second SVG control system having common inputs and outputs can be connected in parallel with that shown in FIG. 2. Because of small component tolerances and drifts, the respective outputs of the paralleled CDC's would not necessarily remain equal even if no component failure occurred in either one of the current demand computers. Thus comparing the outputs of the paralleled SVG's controls for inequality is not a sufficient means to determine the existence of a malfunction in a SVG. However we have found that the concept of parallel control can be used to provide malfunction detection.

The circuit shown in FIG. 3 utilizes a parallel control scheme to achieve malfunction detection. The SVG 300 consists of two current demand computers (CDC) 310 and 320 having the common inputs 330, 331, 332, and 334 representing reference signal $V_{REF}$, the slope reference S, the output terminal voltage $V_T$, and the output terminal current $I_T$, respectively and outputs 336 and 338 representing linearized current control signals $I_1^*$ and $I_2^*$, respectively. $V_{REF}$ and S are reference signals. $V_T$ and $I_T$ are feedback signals. The output 336 of CDC 310 serves as the input to the linearized firing angle control 340 and power circuit 342 portions of the SVC that represent the output circuitry. The output 344 of the power circuit provides reactive compensation via the transformer 346 to the electrical system 350 represented by the inductor 352 having a randomly varying impedance $L_{XM}$ and the generator 354. Potential transformer 360 and current transformer 362 are transducers that provide the feedback signals $V_T$ and $I_T$, respectively. The outputs 336 and 338 also serve as inputs to a compensator or equalizer 370 consisting of a clamped difference amplifier 372 having $I_1^*$ and $I_2^*$ as its inputs and connected to its output 374 a summing resistor 376 having a resistance R. Because the output excursion of the difference amplifier 372 is limited to stay within (or clamped within) preselected output levels, typically between $-10$ to $+10$ volts it is termed a clamped difference amplifier. The output signal $I_{cl}$ of the equalizer 370 serves as an additional input to CDC 320. The outputs of CDC 310 and 320 also serve as inputs to comparator 380 that will have an output 382 whenever the inputs are not substantially equal. A second comparator 390 has one input connected to the output of CDC 310 and other input 392 connected to the scaler 394 that provides an appropriately scaled current signal $I_{TS}$ representing the output 344 of the SVC power circuit. An output 396 is produced by the comparator 390 whenever the inputs 336 and 292 are not substantially equal, i.e. the difference between them is less than or equal to 5%.

In operation, current demand controller 310 produces the linearized current control signal $I_1^*$ used to regulate the compensation provided to the electrical system 350 and is considered as the director control. The second CDC 320 produces the linearized control signal $I_2^*$ that will be used to provide malfunction detection. Because the second CDC 320 uses the same inputs as CDC 310 and is substantially identical to the first CDC 310 except that an additional summing point for utilizing the compensation signal $I_{cl}$ is provided, and uses the same inputs as CDC 310, the output of the second CDC 320 is made to track the output of the first CDC 310. The second CDC 320 is also referred to as a tracker control. The equalizer 370 compares the outputs of both the director control and the tracker control and provides compensation to the tracker control to overcome any differences caused by component tolerances or voltage offsets in the control circuitry. Clamping of the output of the difference amplifier 372 and use of the summing resistor 376 ensure that the amount of compensation provided by the equalizer is limited only to that necessary to overcome difference in the linearized current control signals $I_1^*$ and $I_2^*$ caused by the variance in the tolerances of the circuit components in both the director control and the tracker control. By providing this compensation to the output of the tracker control, i.e., linearized control signal $I_2^*$, this control signal is made to track and be equal to that of the director control. By comparing these two signals any variance between them can be made to result in an output fault indication from comparator 380. A deadband within which the two compared signals can vary without causing a fault indication can also be used. Because the control signal $I_1^*$ is linearized and the FAC 340 and power circuit 342 are also linear, the output of the power circuit 344 has a linear relationship with the control signal $I_1^*$. Thus by appropriately scaling the output signal $I_T$ and then comparing it with the input control signal, $I_1^*$ detection of a malfunction in the output circuitry of the SVG is possible.

Should $I_1^*$ begin to drift due to a malfunction in CDC 310, the output signal $I_T$ because of the linear relationship to $I_1^*$ will follow, assuming that the output circuitry is functioning properly, resulting in a fault indication from comparator 380. Assuming that both CDC 310 and 320 are functioning properly, should the output $I_T$ begin to drift then comparator 390 will produce a fault indication. When a fault occurs in CDC 310, the output $I_2^*$ of CDC 320, the tracker control, will tend to move in the opposite direction eventually saturating. With a malfunction in the director control, CDC 310, a change in the voltage of the system will occur in turn affecting the tracker control, CDC 320, via the feedback signals provided thereto. As a result of this change, the tracker control will try to reverse the change in the opposite direction, thus eventually saturating. The drifting by the director control and the resulting counter action by the tracker control are of a magnitude such that the compensation provided by the equalizer will be unable to counter the change in the tracker control signal produced by the abnormal feedback signals that are caused by the malfunctioning director control. Thus, if the output of comparator 390 indicates no fault while a fault was indicated at comparator 380 with the inputs saturated in the opposite direction, we have found that the probability is greater that there has been a malfunction with the director control than with the tracker control. This is because the output of the tracker control is not used by the output circuitry and will not change the feedback signals. Thus a problem in the tracker control will not necessarily cause the saturation of the inputs to comparator 380 in opposite directions. Thus by use of the equalization and compensation technique, malfunction detection in the control loop can be achieved.

Figure 4:
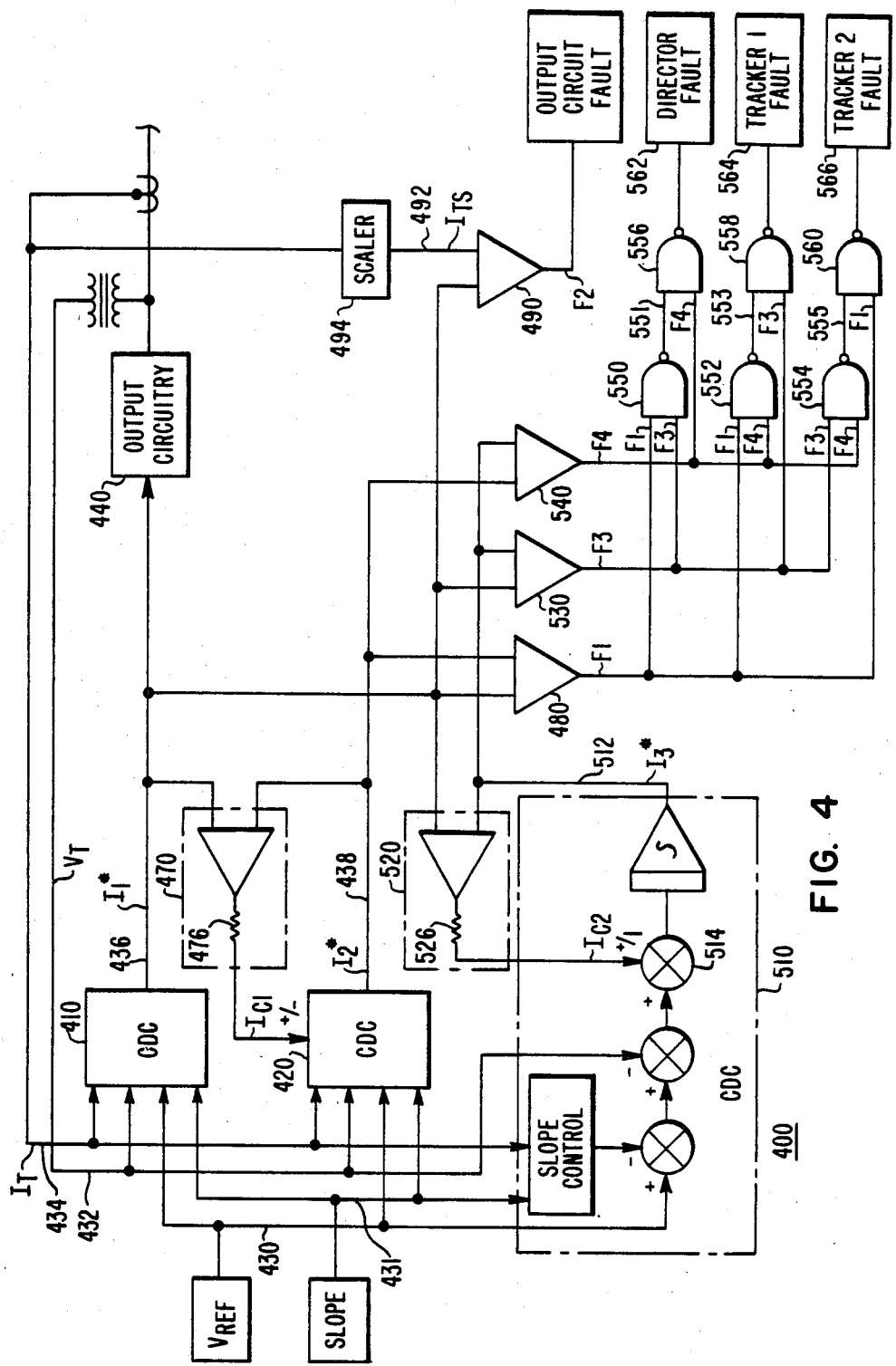
FIG. 4 is a simplified schematic diagram of an alternate embodiment of the invention utilizing fault indication decoding.

By providing a second tracker control a simple two-out-of-three polling system can be used to identify the failed control unit. This alternate embodiment is shown in FIG. 4. There the SVC 400 is provided with the director control 410 having inputs 430, 431, 432 and 434 represent represent the reference signal $V_{REF}$, the slope reference S, the output terminal voltage $V_T$, and the output terminal current $I_T$, respectively and output 436 representing the linearized current control signal $I_1^*$. The first tracker control 420 substantially the same as the director control has $V_{REF}$, S, $V_T$ and $I_T$ as inputs and output 438 representing linearized current control signal $I_2^*$. A first equalizer 470 having inputs $I_1^*$ and $I_2^*$ provides the compensation signal $I_{C1}$ to the first tracker control 420. The output 436 serves as the input signal to the output circuitry 440 that in turn is connected to the transmission system (not shown) as previously described.

A second tracker control 510 substantially the same as the first tracker control 420 has $V_{REF}$, $V_T$ and $I_T$ as inputs and output 512 representing linearized current control signal $I_3^*$. A second equalizer 520 having inputs $I_1^*$ and $I_3^*$ provides the compensation signal $I_{C2}$ via the summing resistor 526 to the second tracker control 510 as indicated at the summing point 514. A similar summing point is provided in the first tracker control 420. The compensation signals $I_{C1}$ and $I_{C2}$ compensate the linearized current control signals $I_2^*$ and $I_3^*$, respectively for component tolerances and offsets in the tracker circuitry allowing these two signals to track the linearized control signal $I_1^*$. The amount of compensation is determined by the value of the summing resistors 476 and 526 and is limited to 1% per unit value or less. The linearized output signals are provided to the comparators along with the output 492 of the scaler 494 that represents a scaled version $I_{TS}$ of the output terminal signal $I_T$.

The inputs to comparators 480, 490, 530 and 540 are $I_1^*$ and $I_2^*$, $I_1^*$ and $I_{TS}$, $I_1^*$ and $I_3^*$, and $I_2$ and $I_3^*$, respectively having outputs F1, F2, F3, and F4, respectively. The outputs of the comparators are present whenever a miscompare exists between the inputs. A deadband within which the inputs can vary without generating a fault output can also be used. In order to determine which one of the three control units is malfunctioning only fault outputs F1, F3, and F4 needed to be polled because output F2 represents a fault in the output circuitry 440. The polling logic for these three outputs is set forth in the truth table given in Table 1. There a fault output is indicated by a "1" and no fault output by a "0".

| OUTPUT FAULT | | | FAULT INDICATION | | |
|---|---|---|---|---|---|
| F1 | F3 | F4 | DIRECTOR | FIRST TRACKER | SECOND TRACKER |
| 1 | 1 | 0 | 1 | 0 | 0 |
| 1 | 0 | 1 | 0 | 1 | 0 |
| 0 | 1 | 1 | 0 | 0 | 1 |

As can be seen in the Table 1 when the director control unit is malfunctioning, both F1 and F3 indicate a fault while F4 does not. Similarly, when the first tracker unit is malfunctioning, both F1 and F4 indicate a fault while F3 does not and when the second tracker unit is malfunctioning, F3 and F4 indicate a fault while F1 does not. Thus, by this two-out-of-three vote, the failed control unit, be it the director control or one of two tracker controls, can be determined. This malfunction detecting scheme can be used where a single control unit has malfunctioned. Additional tracker control units together with a corresponding change in the polling logic can be provided to increase redundancy and further isolation of faults. However, the preferable arrangement is to provide either one or two tracker control units in the SVG.

A circuit for decoding the fault outputs of the comparators 380, 390, 530 and 540 is shown in FIG. 4. Fault signals F1 and F3, F1 and F4 and F3 and F4 serve as the inputs for NAND gates 550, 552 and 554, respectively. The output 551 of NAND gate 550 is one input to NAND gate 556 with the other input being fault signal F4. For NAND gate 558 the inputs are the output 553 from NAND gate 552 and fault signal F3. For NAND gate 560 the inputs are the output 555 from NAND gate 3 and the fault signal F1. Should a fault occur in the director control unit, the output 562 of NAND gate 556 will be present. A fault in the first tracker control unit will produce output 564 from NAND gate 558 and a fault in the second tracker control unit will result in output 556 from NAND gate 560. Other logic circuitry can also be employed to decode the output of the comparators to provide proper indication of which control unit is in fault.

Although the above embodiments deal with a current demand computer, by providing appropriate transducers, the concept disclosed by this invention can also be employed with power. The linearized current control signals and current demand computers would then be referred to as linearized power control signals and power demand computers. In addition switches can be provided in the various signal lines allowing for the disconnection of a malfunctioning director control unit and the substitution of a properly functioning tracker control unit in its place to allow continued operation of the SVC on a temporary basis until the malfunctioning control unit can be replaced. Further where a single tracker control is used, circuits for detection of saturation of the inputs to the fault comparator can be added to provide indication that the director control has malfunctioned. Other malfunction or shutdown logic can be used than that described. A microprocessor can be used for the implementation of the various embodiments of the invention described herein. Other embodiments of the invention will be apparent to those skilled in the art from consideration of this specification or practice of the invention disclosed herein. It is intended that the specification be considered as exemplary only with the true scope and spirit of the invention being indicated by the following claims.

We claim:

1. A VAR generator for providing reactive compensation output to an electrical system, comprising:
   reactance means for providing reactive compensation, the output thereof being linearly responsive to a first linearized control signal;
   transducer means for monitoring the output of the VAR generator and producing a feedback signal that is proportional to the reactive compensation provided;
   reference signal means for providing a reference signal related to the reactive compensation required;
   director control means for providing to the reactance means the first linearized control signal in response to the reference signal and the feedback signal;
   tracker control means substantially identical to the director control means for providing a second linearized control signal in response to the reference signal and the feedback signal;
   equalizing means for determining the difference between the first and second linearized control signals and providing limited compensation of the second linearized control signal, the amount of compensation being limited to that which counters the difference between the first linearized control signal and the second linearized control signal caused by the offset and component tolerances of the director control and the tracker control means whereby the second linearized control signal is made substantially equal to and tracks the first linearized control signal;
   first comparator means for comparing the compensated second linearized control signal with the first linearized control signal, the first comparator means having an output whenever the first linearized control signal and compensated second linearized control signal are not substantially equal to one another, the output thereof indicating that a fault has occurred in one of the two control means; and
   second comparator means for comparing the first linearized control signal with the output of the reactance means, the second comparator means having an output whenever the first linearized control signal and the output signal are not substantially equal to one another, the output thereof indicating that a fault has occurred in the reactance means.

2. The apparatus of claim 1 further comprising:
   switching means for disconnecting the director control means and reconnecting the tracker control means as the director control means whenever the first comparator means indicates a fault.

3. The apparatus of claim 1 wherein the equalizing means comprises:
   a clamped difference amplifier having an input connected to the first linearized control signal, an input connected to the second linearized control signal and an output proportional to the difference between the two control signals; and
   a summing resistor in series connection between the output of the difference amplifier and the tracker control means.

4. The apparatus of claim 3 wherein the output range of the difference amplifier is clamped to stay within the range between about −10 volts to about +10 volts.

5. A VAR generator for providing reactive compensation output to an electrical system, comprising:
   reactance means for providing reactive compensation, the output thereof being linearly responsive to a first linearized control signal;
   tranducer means for monitoring the output of the VAR generator and producing a feedback signal that is proportional to the reactive compensation provided;
   reference signal means for providing a reference signal related to the reactive compensation required;
   direction control means for providing to the reactance means the first linearized control signal in response to the reference signal and the feedback signal;
   first tracker control means substantially identical to the director control means for providing a second linearized control signal in response to the reference signal and the feedback signal;
   second tracker control means substantially identical to the first tracker control means for providing a third linearized control signal in response to the reference signal and the feedback signal;
   first equalizing means for determining the difference between the first and second linearized control signals and providing limited compensation of the second linearized control signal, the amount of compensation being limited to that which counters the difference between the first linearized control signal and the second linearized control signal caused by the offset and component tolerances of the director control and the first tracker control means whereby the second linearized control signal is made substantially equal to and tracks the first linearized control signal;
   second equalizing means for determining the difference between the first and third linearized control signals and providing limited compensation of the third linearized control signal, the amount of compensation being limited to that which counters the difference between the first linearized control signal and the third linearized control signal caused by the offset and component tolerances of the director control and the second tracker control means whereby the third linearized control signal is made substantially equal to and tracks the first linearized control signal;

first comparator means for comparing the compensated second linearized control signal with the first linearized control signal, the first comparator means having an output whenever the first linearized control signal and compensated second linearized control signal are not substantially equal to one another;

second comparator means for comparing the first linearized control signal with the output of the reactance means, the second comparator means having an output whenever the first linearized control signal and the output signal are not substantially equal to one another, the output thereof indicating that a fault has occurred in the reactance means;

third comparator means for comparing the compensated third linearized control signal with the first linearized control signal, the third comparator means having an output whenever the first linearized control signal and compensated third linearized control signal are not substantially equal to one another;

fourth comparator means for comparing the compensated second linearized control signal with the compensated third linearized control signal, the fourth comparator means having an output whenever the second linearized control signal and compensated third linearized control signal are not substantially equal to one another; and fault indication means for indicating when one of the three control units is in a fault condition, the fault indication means having as inputs the outputs of the first, third, and fourth comparator means with these inputs being decoded by the fault indication means to determine which one of the three control units is in a fault condition.

6. The apparatus of claim 5 wherein the first equalizing means and the second equalizing means each comprise:

a clamped difference amplifier having a first input connected to the first linearized control signal, a second input connected to the linearized control signal of its respective tracker control means and an output proportional to the difference between the two control signals, and a summing resistor in series connection between the output of the difference amplifier and the respective tracker control means.

7. The apparatus of claim 6 wherein the output range of the difference amplifier is clamped to stay within the range between about −10 volts to about +10 volts.

* * * * *